LOW RC SEMICONDUCTOR DIODE

Filed April 4, 1962

INVENTORS
TERUO HAYASHI
AKIRA YOKOTA
BY
Roy C. Hopgood
ATTORNEY

United States Patent Office 3,242,392

Patented Mar. 22, 1966

3,242,392
LOW RC SEMICONDUCTOR DIODE

Teruo Hayashi and Akira Yokota, both of Tokyo, Japan, assignors to Nippon Electric Company Limited, Tokyo, Japan, a corporation of Japan

Filed Apr. 4, 1962, Ser. No. 185,162
Claims priority, application Japan, Apr. 6, 1961, 36/12,102
1 Claim. (Cl. 317—234)

This invention relates to a semiconductor diode and more particularly to an improved semiconductor diode which is especially useful at microwave frequencies.

When a semiconductor diode is used in a detector, amplifier, or oscillator circuit, the internal capacitance C and resistance R of the diode becomes a serious problem at microwave frequencies. In general, it is desirable to keep the product of the capacitance and the resistance (C x R) as low as possible for the diode, but there are several conflicting factors which make this very difficult in practice. It has been found, for example, that semiconductor materials which have a low specific resistance have a high capacitance per unit area. Therefore, if the resistance of the semiconductor is lowered, the effect on the CR product of the diode is counteracted by the corresponding increase in capacitance. The capacitance can be reduced by making the junction area of the diode smaller, but this raises the resistance of the diode because the resistance is inversely proportional to cross sectional area, and it furthermore weakens the diode mechanically so that is liable to break at the junction. This weakening of the diode structure is particularly serious in aircraft, missile, or spacecraft circuits, which must be able to withstand extreme shocks and vibrations.

Accordingly, the principal object of this invention is to provide a semiconductor diode having a very low CR product and a sturdy mechanical structure.

Another object of this invention is to provide a diode of the above noted type which is economical to manufacture and reliable in operation.

Other objects and advantages of the invention will become apparent to those skilled in the art from the following description of several specific embodiments thereof, as illustrated in the attached drawings, in which.

Figure 1:
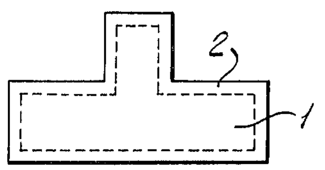
FIG. 1 is an elevation view of a mesa-type semiconductor pellet used in one embodiment of the invention.
Figure 2:
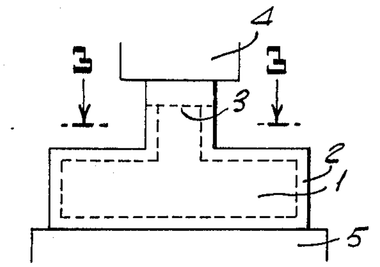
FIG. 2 is an elevation view of the semiconductor pellet of FIG. 1 mounted between two electrodes.
Figure 3:
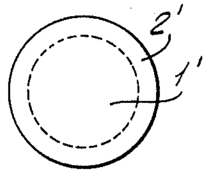
FIG. 3 is a sectional view taken on the line 3—3 of FIG. 2.

FIG. 1 shows a mesa-wafer pellet (i.e., one containing a flat topped hill with abrupt sides terminating in a planar wafer) of high resistance semiconductor material 1, which can be either P or N in conductivity type. In accordance with this invention, a $P^+$ or $N^+$ region 2 is formed on the outside of pellet 1 by diffusing into the surface of the pellet the same type of impurity as contained in the semiconductor material 1. Since the concentration of impurities in region 2 is high, its resistance will be correspondingly low. Therefore the pellet will contain a relatively high resistance central core 1′ (FIG. 3) and a relatively low resistance outer shell 2′. A PN junction 3 (FIG. 2) is formed near the top of the mesa by diffusing or alloying impurities of the opposite type into the mesa from its top to a depth greater than the depth of low resistance region 2. The PN junction 3 intersects both the high resistance central core 1′ of the mesa and the low resistance outer shell 2′ thereof, as indicated in FIG. 3. The diode construction is completed by attaching a first electrode 4 to the top of the mesa and a second electrode 5 to the bottom of the pellet.

With the above described diode construction, the capacitance of junction 3 is low because most of its area comprises the high resistance semiconductor material 1, which has a low capacitance per unit area. Furthermore, at microwave frequencies, the resistance of the diode is low because most of the current will flow through the low resistance outer shell 2 due to the skin effect. Thus the diode of this invention has a very low capacitance and a very low resistance, which gives it a very low CR product. In addition, the diode of this invention has a sturdy mechanical structure which can withstand extreme shocks and vibrations without breaking, due to its relatively large junction area.

Any suitable prior art fabrication techniques can be used in making the above described embodiment of this invention, as will be understood by those skilled in the art, and any suitable concentration of impurities can be used therein depending on the desired resistance, capacitance, and physical size of the diode. The particular semiconductor material, physical dimensions, and impurity concentrations required in any given embodiment of the invention can be easily calculated by those skilled in the art from well known prior art formula.

Figure 4:
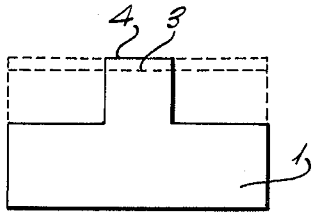
FIG. 4 is an elevation view of a mesa-type semiconductor pellet used in another embodiment of the invention.
Figure 5A:
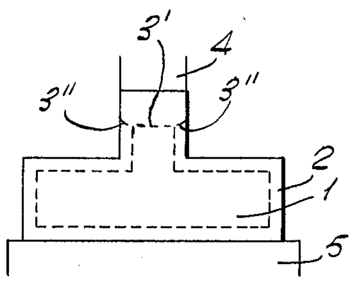
FIG. 5A is an elevation view of the semiconductor pellet of FIG. 4 mounted between two electrodes.
Figure 5B:
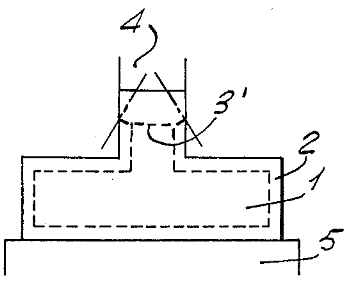
FIG. 5B is a second elevation view of the semiconductor pellet of FIG. 4.

FIGS. 4 and 5 illustrate a different method of making the diode of this invention. In this second method, a junction 3 is formed near the top surface of a flat pellet of high resistance semiconductor material 1, as indicated by the dotted lines in FIG. 4, by diffusing thereinto a relatively high concentration of impurities which are opposite in type from the impurities contained in semiconductor material 1. The top surface of the pellet is then cut into a mesa form, as indicated by the solid lines in FIG. 4, and impurities of the same type as those contained in semiconductor material 1 are then diffused into the surface of the pellet to form a $P^+$ or $N^+$ region 2, indicated in FIG. 5A. While the second impurities are being diffused into the surface of the pellet, the first impurities will be diffused deeper into the mesa to form a deeper junction surface 3′ having a cupped periphery 3″. Since the concentration of impurities is high on both sides of the junction periphery 3″, this embodiment of the invention will exhibit the tunnel effect where most of the current will flow across the periphery of the junction, but not at low frequencies, where most of the current will flow across the central part of the junction. If desired, this embodiment of the invention can be altered to act as an ordinary diode at microwave frequencies by simply removing the high concentration boundary region, as indicated by the dashed lines in FIG. 5B.

From the foregoing description, it will be apparent that this invention provides a diode which has a very low CR product and a sturdy mechanical structure. It will also be apparent that this invention provides a diode of the above noted type which is ecnomical to manufacture and reliable in operation. And it should be understood that this invention is by no means limited to the specific structures disclosed herein by way of example, since many modifications can be made therein without departing from the basic teaching of this invention. For example, it is not essential to use a mesa-type semiconductor pellet to form the diode of this invention; a cylindrical pellet, or any other suitable shape, could be used instead. This and many other modifications will be apparent to those skilled in the art, and this invention includes all modifications falling within the scope of the following claim.

We claim:

A semiconductor diode comprising a high resistance doped semiconductor mesa-wafer pellet of a first impurity type, a high concentration of said first type impurity surrounding said pellet to form a low resistance peripherial portion, a PN junction extending across the interior of the mesa intersecting at the periphery thereof the said low resistance portion, a first electrode attached to the top of said mesa, and a second electrode, attached at the other side of said pellet.

References Cited by the Examiner

UNITED STATES PATENTS

| | | | |
|---|---|---|---|
| 2,804,405 | 8/1957 | Derick et al. | 148—187 X |
| 2,843,511 | 7/1958 | Pankove | 317—235 |
| 2,868,683 | 1/1959 | Jochems et al. | 317—235 |
| 2,937,114 | 5/1960 | Shockley | 317—235 |
| 2,992,471 | 7/1961 | Riesz | 317—235 |
| 3,006,791 | 10/1961 | Webster | 317—235 |
| 3,007,090 | 10/1961 | Rutz | 317—235 |
| 3,064,132 | 11/1962 | Strull | 317—235 |
| 3,067,485 | 12/1962 | Ciccoletta et al. | 317—235 X |
| 3,079,512 | 2/1963 | Rutz | 317—234 |
| 3,116,184 | 12/1963 | Miller | 148—189 X |

JOHN W. HUCKERT, *Primary Examiner.*

JAMES D. KALLAM, DAVID J. GALVIN, *Examiners.*

A. LESNIAK. *Assistant Examiner.*